United States Patent
Tzidon et al.

(10) Patent No.: US 9,627,726 B2
(45) Date of Patent: Apr. 18, 2017

(54) SHUTDOWN SYSTEM FOR METAL-AIR BATTERIES AND METHODS OF USE THEREOF

(71) Applicant: PHINERGY LTD., Lod (IL)

(72) Inventors: Dekel Tzidon, Hod Hasharon (IL); Ilya Yakupov, Rehovot (IL)

(73) Assignee: PHINERGY LTD., Lod (IL)

( * ) Notice: Subject to any disclaimer, the term of this patent is extended or adjusted under 35 U.S.C. 154(b) by 128 days.

(21) Appl. No.: 14/390,577

(22) PCT Filed: Mar. 14, 2013

(86) PCT No.: PCT/IL2013/050242
§ 371 (c)(1),
(2) Date: Oct. 3, 2014

(87) PCT Pub. No.: WO2013/150520
PCT Pub. Date: Oct. 10, 2013

(65) Prior Publication Data
US 2015/0171494 A1    Jun. 18, 2015

Related U.S. Application Data

(60) Provisional application No. 61/620,241, filed on Apr. 4, 2012.

(51) Int. Cl.
*H01M 12/06* (2006.01)
*H01M 12/08* (2006.01)
*H01M 6/50* (2006.01)
*H01M 4/02* (2006.01)

(52) U.S. Cl.
CPC ....... *H01M 12/065* (2013.01); *H01M 6/5072* (2013.01); *H01M 12/06* (2013.01); *H01M 12/085* (2013.01); *H01M 2004/021* (2013.01)

(58) Field of Classification Search
CPC .. H01M 12/065; H01M 12/06; H01M 12/085; H01M 6/5072; H01M 2004/021
See application file for complete search history.

(56) References Cited

U.S. PATENT DOCUMENTS

| | | |
|---|---|---|
| 4,081,693 A | 3/1978 | Stone |
| 4,317,863 A | 3/1982 | Struthers |
| 4,521,497 A | 6/1985 | Tamminen |
| 5,186,758 A | 2/1993 | Hartman |
| 5,515,939 A | 5/1996 | Korall et al. |
| 7,940,028 B1 | 5/2011 | Hermann |
| 8,124,274 B2 | 2/2012 | Marple et al. |

(Continued)

FOREIGN PATENT DOCUMENTS

| | | |
|---|---|---|
| CN | 102338767 A | 2/2012 |
| GB | 1450969 A | 9/1976 |

(Continued)

OTHER PUBLICATIONS

Supplementary European Search Report for European Application No. 13772972.9 dated Oct. 22, 2015.

(Continued)

*Primary Examiner* — Gregg Cantelmo
(74) *Attorney, Agent, or Firm* — Pearl Cohen Zedek Latzer Baratz LLP

(57) ABSTRACT

This invention provides a shutdown system and methods for battery shutdown followed by a standby mode using a washing solution controlled by pH such that the electrode remains stable.

5 Claims, 3 Drawing Sheets

(56) References Cited

U.S. PATENT DOCUMENTS

2009/0008268 A1    1/2009   Salathe et al.
2011/0159360 A1    6/2011   Hirota et al.

FOREIGN PATENT DOCUMENTS

| JP | 2003-123755 A | 4/2003 |
| JP | 2003-187787 A | 7/2003 |
| JP | 2004-206990 A | 7/2004 |
| JP | 2010-108624 | 5/2010 |
| JP | 2012-015025 A | 1/2012 |
| WO | WO 90/11625 A1 | 10/1990 |
| WO | WO 01/33659 A1 | 5/2001 |

OTHER PUBLICATIONS

International Search Report for PCT Application No. PCT/IL2013/050242 mailed Jul. 19, 2013.
Office Action for Chinese Patent Application No. 201380029387.7 issued Nov. 23, 2016.
Office Action for Japanese Patent Application No. 2015-503990 issued Nov. 15, 2016.

SHUTDOWN SYSTEM FOR METAL-AIR BATTERIES AND METHODS OF USE THEREOF

CROSS-REFERENCE TO RELATED APPLICATIONS

This application is a National Phase Application of PCT International Application No. PCT/IL2013/050242, International Filing Date Mar. 14, 2013, claiming priority of United-States Provisional Patent Application No. 61/620,241, filed Apr. 4, 2012 which are hereby incorporated by reference.

FIELD OF THE INVENTION

This invention provides a shutdown system and methods for battery shutdown followed by a standby mode using a washing solution controlled by pH such that the electrode remains stable.

BACKGROUND OF THE INVENTION

Aluminum air battery is a metal air battery where the anode comprises aluminum. Aluminum is a lightweight metal, which produces three electrons per atom at oxidation. The electrochemical capacity of aluminum is 2.98 Ah/g, which is comparable to that of lithium (3.86 Ah/g). Moreover, flat aluminum anodes are not readily flammable in air atmosphere and are relatively non-expensive.

The use of aluminum as an anode, in combination with an air cathode, and a circulating highly-conductive aqueous alkali electrolyte provides a very attractive battery performance, regarding energy, power density and safety.

At normal aluminum-air battery operation conditions, aluminum dissolution in alkali electrolyte is electrochemical, according to the following reaction:

(reaction 1)

However, in parallel to this beneficial reaction, portions of the aluminum at contact with the alkaline electrolyte undergoes the undesirable direct chemical dissolution:

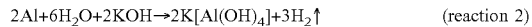
(reaction 2)

The ratio between the rate of the beneficial electrochemical reaction 1 to the total rate of aluminum dissolution (Reaction 1 and 2 together) produces the actual aluminum utilization efficiency coefficient [e], which is one of the major parameters characterizing the performance of an Al-air battery:

$$e = \frac{R1}{R1 + R2}$$

By balancing the operation parameters, such as the current density and the working temperature, and by application of certain additives, the efficiency of aluminum conversion (ε) to electricity can be kept well above 90% (sometimes close to 100%).

A substantial practical obstacle for widespread implementation of Al-air batteries in practical applications such as electric vehicles, results from the requirement for such a battery to be shutdown at any moment, to be safe at standby for any period of time, and to be ready for quick restart to the full power at any moment. The main problem here is the susceptibility of aluminum to a very intensive corrosion in alkaline electrolyte at open circuit voltage (OCV). This process results in consumption of the aluminum anode material without generation of external electrical energy. It also results in unwanted, extensive hydrogen evolution (reaction 2), and in electrolyte degradation. Hydrogen evolution from aluminum corrosion (aluminum oxidation) in alkali solutions adds an additional safety problem to the battery halting issue.

The most straightforward way to avoid aluminum-electrolyte reaction (reaction 2) when electric load is not applied (at temporary stop or at shutdown for prolonged time) is to prevent physical contact between the aluminum electrodes and the electrolyte.

Therefore, the obligatory condition when stopping the battery is to take the electrolyte out of the cell. In the case of Al-air battery with recycling electrolyte this operation can be easily performed by re-directing (e.g. pumping) the electrolyte flow back into an electrolyte storage tank for complete battery emptying.

However, even the most thorough emptying of electrolyte from a battery (whether it is free-flow gravitational or forced by a pump) leaves a substantial amount of electrolyte in the battery. Residual electrolyte in the battery can be found as a film on the aluminum surface. It can also be found on the cell walls, or as a liquid soaked in the porous air electrode body and entrapped in poorly-drainable corners.

Electrolyte residue that is located in direct contact with the anode will continue to react with aluminum (according to the reaction 2), causing liquid decomposition, and formation of a layer of aluminum hydroxide and/or other products on the anode surface. Moreover, after residual electrolyte film on the anode is consumed, the corrosion reaction does not stop. The reaction of surface film formation, from our experience, continues to a rather high extent due to two factors:

Reaction continues because aluminum hydroxide layer, which is formed on the anode surface, is not dense, and does not prevent the reaction progress (corrosion continuation deeper into aluminum metal body);

Even after electrolyte at direct contact with anode surface is consumed—reaction continues because of new portions of residual electrolyte in the battery is attracted to aluminum, because of capillary forces, and good wetting properties of concentrated alkali.

Unavoidable reaction of aluminum anodes with electrolyte residue entrapped in the battery is extremely damaging, first of all as a result of the formation of an inert surface film (of aluminum hydroxide) on the surface of the anodes. This passivation layer results in problematic battery restart after shutdown/standby cycle. Second, the electrolyte and reaction products can dry out, blocking (clogging) the hydraulic system. In this case a restart of the battery will be very difficult if possible at all.

Thus, electrolyte pumping-out may not be enough to provide effective battery stop and conservation for dry long term standby (without electrolyte). Actually, very careful water rinsing of the electrodes and of the system is needed in order not to leave any noticeable residual electrolyte and/or reaction product inside the system.

In order to reach this goal (to wash out all the residual electrolyte and reaction products), plenty of reserve water should be included in the battery system, increasing the system weight and volume. This affects gravimetric and volumetric energy density of the system.

There were few attempts to solve the problem of aluminum-air battery shutdown and restart. One of them is described in WO 01/33659A1 for small single static cell Al-Air battery with a replaceable cartridge containing anode and electrolyte. In this system the shut-down-run modes of operation were carried out by emptying and then replacing the electrolyte bag. However WO 01/33659A1 does not disclose cleaning the cell from residual products and electrolyte.

SUMMARY OF THE INVENTION

In one embodiment, this invention provides systems and methods for washing an electrode of a metal-air battery in a shutdown or a standby mode. In one embodiment, systems and methods of this invention prevent, reduce or eliminate the degradation of the electrode during shutdown/standby mode. In one embodiment, systems and methods of this invention assist in stabilizing the electrode. In one embodiment, washing systems and methods of the invention improve the life time and the performance of the electrode.

In one embodiment, this invention provides a shutdown system for washing an electrode of a metal-air battery, said system comprising:
 a washing solution circulation elements;
 a unit for storing an acidic agent; and
 an acidic agent dosing element, said dosing element is in contact with said washing solution and with said unit for storing an acidic agent.

In one embodiment, the system of this invention further comprising a pH monitoring element, wherein said pH monitoring element is in contact with said washing solution.

In another embodiment, the pH monitoring element is a pH meter. In another embodiment, the pH monitoring element is a voltage meter.

In one embodiment, the system of this invention comprises a unit for storing an acidic agent. In another embodiment, the acidic agent includes an inorganic acid. In another embodiment, the acidic agent includes an organic acid. In another embodiment, the acidic agent includes a salt of strong acid with weak base.

In one embodiment, the system of this invention comprises a washing solution circulation elements. In another embodiment, the washing solution circulation elements comprise a reservoir, a tank, a container, a hose, a tube, a pipe, a conduit, a connector, a pump, a piston, a motor, a syringe or a combination thereof. In another embodiment, the washing solution circulation elements include a washing solution reservoir, and conduits for the circulation of the washing solution between the battery, and the washing solution reservoir.

In one embodiment, this invention provides a method for battery shutdown followed by a standby mode, said method comprises:
transferring an electrolyte solution of a battery to an electrolyte tank;
circulating a washing solution through said battery; and
transferring said washing solution to a washing solution reservoir wherein said washing solution reached a predetermined pH value;
thereby the battery is shutdown and is in a standby mode.

In another embodiment, during the circulation step, the pH of said washing solution is monitored and wherein if the pH value of said washing solution is higher than a predetermined value, an acidic agent is added to said washing solution.

In one embodiment, this invention is directed to an electric vehicle comprising a system for washing an electrode of a metal-air battery of this invention, wherein energy from said metal air battery is used for propelling the vehicle, and wherein said shutdown system for washing is activated for preparing said battery for a standby mode.

In one embodiment, the electrolyte solution is transferred from said battery to an electrolyte reservoir. In one embodiment, the predetermined pH value ranges between 4 and 9. In one embodiment, pH monitoring is conducted using a pH monitor, a voltage meter or a combination thereof. In one embodiment, the circulating of said washing solution is performed between the battery and between a washing solution reservoir that is connected to said battery.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
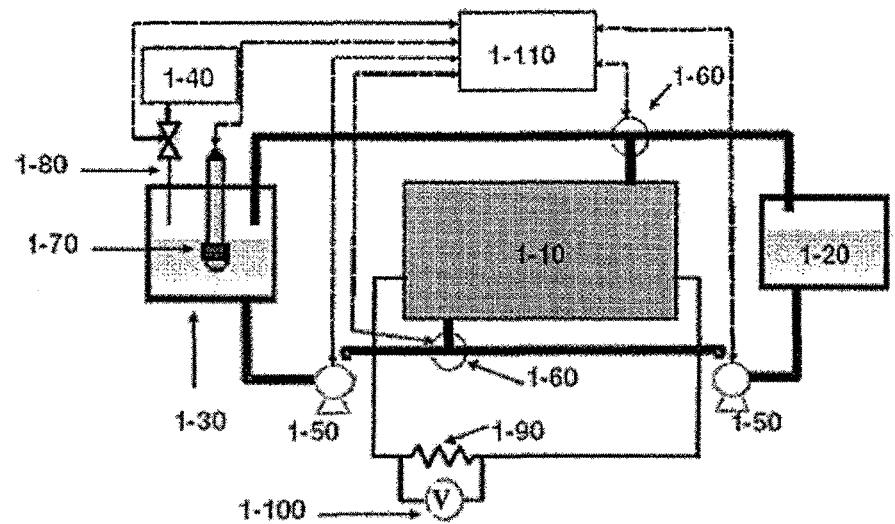
FIG. 1 is a scheme of an Al-air battery system with recycling electrolyte and shutdown system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment, a system for preserving an alkaline metal-air battery electrode in a standby or shutdown mode is disclosed. In another embodiment, the electrode is a zinc electrode. In another embodiment, the electrode is an aluminum electrode. In one embodiment, the system provides a solution for the problem of electrode chemical degradation by the electrolyte in a standby or shutdown mode (e.g. when the battery is not operated). In one embodiment, system of the invention provides a closed loop of washing solution with controlled addition of acidic agent.

The absence of robust solution for aluminum battery shutdown was one of the reasons that prevented practical application of this high-energy density power source.

In one embodiment, this invention provides a practical alternative to the need of battery washing with plenty of water, and the need to dispose a big amount of alkaline waste, at each shutdown cycle.

In one embodiment, the invention provides a practical solution for an alkaline metal-air battery electrode that is used for propelling an electric vehicle, where the battery is shutdown or in standby mode.

This invention provides a shutdown system for washing the electrode with a closed loop of reusable washing solution, to which a small amount of acidic agent is added at each shutdown washing action, by a specified controlling mechanism.

The proposed aluminum-air battery shutdown system includes a washing solution reservoir, valves and pumps that enable electrolyte removal from the battery to an electrolyte tank. The system of the invention further provides switching means to switch the liquid circulation from the battery and the electrolyte tank to a liquid circulation between the battery and the washing solution (which is stored in the separate tank). A small container including a concentrated acidic agent (=neutralizing agent), which is added to the circulated washing solution by a dosing device. The amount of neutralizing agent added is set automatically, according to the response of a pH measuring electrode, or as a result of a battery voltage measurement, as described below.

In one embodiment, this invention provides a shutdown system for washing an electrode of a metal-air battery, said system comprising:
a washing solution circulation elements;
a unit for storing an acidic agent; and
an acidic agent dosing element, said dosing element is in contact with said washing solution and with said unit for storing an acidic agent.

In another embodiment, the system of this invention further comprises a pH monitoring element, wherein said element is in contact with said washing solution.

In one embodiment, the pH monitoring element in systems of this invention is a pH meter. In one embodiment, the pH monitoring element in systems of this invention is a voltage meter. In another embodiment, a skilled in the art will know how to translate a voltage to the pH of a solution. In another embodiment, a decrease in the voltage is correlates with a decrease in pH.

In one embodiment, a system of the invention is described with reference to FIG. 1. FIG. 1 schematically shows a shutdown system for an metal-air battery with recycling electrolyte. In the figure, metal air battery (1-10) is described. The metal-air battery is connected by a liquid circulation lines (heavy lines) to a recycling electrolyte tank (1-20) and to a washing solution tank (1-30). The system further comprises an acidic agent stock solution container (1-40). A process control computer (1-110) controls the various elements of the system. The computer is connected by control signal lines (dashed lines in the figure) to the system's elements. The system further comprises three-way valves (1-60), a pH electrode (1-70); and an acidic agent dosing device (1-80). The dosing device is automatically controlled and it has at least two positions: an open position wherein acidic agent is transferred to the washing solution tank and a closed position wherein no acidic agent is transferred to the washing solution tank.

In FIG. 1, liquid circulation lines are denoted by a heavy line; electric power connections are denoted by a narrow line; and the control signal lines denoted by a dashed line.

In one embodiment, this invention is directed to a vehicle comprising the shutdown system of this invention. In one embodiment, this invention provides an electric vehicle comprising the shutdown system of this invention for washing an electrode of a metal-air battery, wherein energy from said metal air battery is used for propelling the vehicle, and wherein said shutdown system for washing is activated for preparing said battery for a standby mode.

In one embodiment, the system, electrical vehicle, and methods of this invention include an electrode. In another embodiment, the electrode is an alkaline metal-air battery electrode. In another embodiment, the electrode is a zinc or an aluminum electrode.

In one embodiment, the system, electrical vehicle, and methods of this invention comprise a washing solution. In one embodiment the term "washing solution" in this invention refers to deionized water which is used for washing the electrode, and acidic agent is added gradually during circulation through the battery to the deionized water to obtain a predetermined pH. In one embodiment, a "washing solution" in this invention refers to an aqueous solution which was transferred to the washing solution reservoir during the shutdown process and can be reused for another shutdown process.

In one embodiment, acidic agent is added to the washing solution to maintain/obtain/reach a predetermined pH. In one embodiment, the acidic agent comprises an inorganic acid. In one embodiment, the inorganic acid comprises nitric, phosphoric, sulfuric, boric, hexafluorophosphoric acid or combination thereof. In one embodiment, the acidic agent comprises an organic acid. In one embodiment, the organic acid comprises formic, acetic, citric, oxalic, gluconic, ascorbic, tartaric acid or combination thereof. In one embodiment, the acidic agent comprising a salt of strong acid with weak base. In one embodiment, the salt comprising calcium or barium salt of nitric or sulfuric acids. In one embodiment, acidic agent refers to a neutralizing agent. In one embodiment, the acidic agent is used to lower the pH of the washing solution. In one embodiment, the acidic acid comprises an organic and inorganic acid.

In one embodiment, the predetermined pH is defined as the pH which maintains the electrode stable. In another embodiment the pH is between 4-9. In another embodiment, the pH is between 4-10. In another embodiment, the pH is between 5-8. In another embodiment, the pH is between 6-8. In another embodiment, the pH is between 5-9. In another embodiment, the pH is between 6-10.

In one embodiment, the system, electrical vehicle, and methods of this invention comprise washing solution circulation elements. In one embodiment, the washing solution circulation elements comprise a reservoir, a tank, a container, a hose, a tube, a pipe, a connector, a pump, a piston, a motor, a syringe or a combination thereof.

In one embodiment, this invention provides a method for battery shutdown followed by a standby mode, said method comprises:

transferring an electrolyte solution of a battery to an electrolyte reservoir;
circulating a washing solution through said battery; and
transferring said washing solution to a washing solution reservoir wherein said washing solution reached a predetermined pH value;
thereby the battery is shutdown and in a standby mode.

In another embodiment, during the circulation step, the pH of said washing solution is monitored and wherein if the pH value of said washing solution is higher than a predetermined value, an acidic agent is added to said washing solution.

In one embodiment, the method of shutdown battery is activated before a standby mode. In another embodiment, the method of this invention is activated if the battery expected to be in a standby mode for at least one hour. In another embodiment, the method of this invention is activated if the battery expected to be in a standby mode for at least one hour up to several weeks.

In one embodiment, the method of this invention comprises a circulating step. In another embodiment, the circulating step includes circulating a washing solution between said washing solution reservoir and the battery, wherein upon the washing solution reached a predetermined pH value, the washing solution is transferred to the washing solution reservoir and can be reused. In another embodiment, during said circulation, the pH of said washing solution is monitored by pH monitoring element and wherein if the pH value of said washing solution is higher than a predetermined value, an acidic agent is added to said washing solution.

In one embodiment, the methods of this invention, include a step of transferring an electrolyte solution of a battery to an electrolyte reservoir. In another embodiment, the electrolyte can be reused.

In one embodiment, the methods of this invention, include a step of monitoring the pH during circulating the washing solution through the battery. In another embodiment, monitoring the pH is conducted by a pH monitoring element, wherein if the pH value of said washing solution is higher than a predetermined value, an acidic agent is added to said washing solution. In another embodiment, the predetermined pH value ranges between 4-9. In another embodiment, the pH is between 4-10. In another embodiment, the pH is between 5-8. In another embodiment, the pH is between 6-8. In another embodiment, the pH is between 5-9. In another embodiment, the pH is between 6-10. In one embodiment, in methods of this invention, the pH monitoring is conducted using a pH monitor, a voltage meter or a combination thereof. In one embodiment, in methods of this invention, the circulating of the washing solution is performed between the battery and between a washing solution reservoir that is connected to the battery.

In one embodiment, systems and methods of this invention provide instant and effective battery shutdown. In one embodiment, systems and methods of this invention provide prevention of metal anode corrosion. In one embodiment, systems and methods of this invention provide unlimited standby time. In one embodiment, systems and methods of this invention provide easy and fast battery re-activation.

In one embodiment and with reference to FIG. 1, the operation sequence of the battery washing system is as follows:

Valves (1-60), and the direction of electrolyte pumping (by pumps 1-50) are switched to enable the electrolyte evacuation from the battery (1-10) to the electrolyte tank (1-20);

When the battery is empty of electrolyte, three-way valves (1-60) are switched to the position, disconnecting the electrolyte tank (1-20) from the battery, and connecting the washing solution tank (1-30) to the battery (1-10). At this position the washing solution starts to circulate from tank (1-30) through the battery. The electrolyte residue remained in the battery, starts to be washed out by the washing solution flow, changing the pH of the washing solution which is monitored by pH sensor (1-70).

Dosing mechanism (1-80) is activated by controlling computer (1-110), and gradual addition of acidic agent to the washing solution (1-30) starts. The gradual acidic agent addition is conducted simultaneously with the circulation of the washing solution through the battery;

When the desired pH is reached (or when other criteria of shutdown completion is fulfilled) the battery is emptied from the washing solution by re-directing the washing solution circulation back to washing solution reservoir (tank).

According to this method, the volume of the washing solution used to rinse the electrode in the battery is much smaller than in washing techniques involving water only. The volume of the washing solution is yet sufficient to enable effective battery rinsing.

At the beginning of battery operation, the washing solution tank should be loaded by deionized water. This single load can be used for washing in multiple battery shutdown cycles, until the water (and the acidic agent added) becomes saturated by the products of interaction of the electrolyte with the acidic agent. Saturation of the washing solution depends mostly on the amount of electrolyte retained in the battery after emptying.

The mechanism of the disclosed washing method is based on the neutralization of alkaline electrolyte by acidic neutralizing agent. As it was discussed above, the key issue of aluminum-air battery shutdown is the prevention of aluminum corrosion during battery standby mode. Accordingly, the major requirement to the battery shutdown process is to bring the liquid media entrapped in the cell (the battery) to pH values which are non-corrosive towards aluminum.

A basic principle of operation of the disclosed battery shutdown system comprises neutralization of residual alkali electrolyte using an acidic neutralization agent. The practical application of this principle is challenging due to a number of factors:

The alkaline metal-air battery electrode is an active metal that is unstable at both basic and acidic pH. Specifically, aluminum is unstable at a pH value higher than 9 and it is also unstable at a pH value lower than 4. Therefore, adding acidic neutralizing agent in excess may result in a solution pH that is too acidic;

The electrolyte to be neutralized is effectively not a pure alkali solution, but a worn-out mixture, containing different aluminum compounds in addition to alkali and water; The washing solution comes in contact with all parts of the aluminum-air battery, so it should be inert to the air electrodes, especially to the air reduction catalyst and to other battery construction materials. This requirement restricts the choice of the acidic neutralization agent;

The residue of the washing solution will remain in the battery after the washing cycle, so it should be harmless to further battery operation.

Aluminum is considered stable at pH range from 4 to 9, so the purpose of the shutdown washing operation is to bring the residue liquid in the battery to this pH range.

Typical electrolyte of Al-air battery is usually a concentrated (20-40% wt) aqueous solution of strong alkali (sodium or potassium hydroxide), which means that the alkalinity of a fresh electrolyte can be well above the concentration that corresponds to pH=14. During battery operation, part of alkali reacts with the aluminum of the anode, forming alkali aluminates. This results in that titration curve of alkali aluminate solutions by acid usually have two distinct areas: the first one (at higher pH values) that corresponds to alkaline hydroxide neutralization, and the second one (at slightly lower pH), corresponding to the reaction of acid with aluminates. According to the literature, the acid-aluminate reaction usually occurs at the pH area higher than the aluminum metal stability area (higher than pH ~4-9). Accordingly, for the purpose of washing an aluminum-air battery at shutdown, the aluminates should also be neutralized.

The above mentioned requirements define the need for careful shutdown/washing process control, whether directly by pH measurement, or in another indirect way.

Washing Process Control—Acidic Neutralization Agent Dosing

The amount of acidic agent that should be added at each shutdown cycle is the result of two parameters:
the degree of electrolyte utilization (at the moment of shutdown);
the amount of residual electrolyte in the system after electrolyte pumping-out to the tank.

In one embodiment, an indication feedback for the acidic agent dosing is required. In another embodiment, the need for indication feedback is required since the above two parameters may vary to a large extent, and since aluminum requires relatively precise pH set point by the end of the washing treatment at shutdown.

In one embodiment, this invention provides two approaches for feedback control for the acidic agent dosing. The first is by pH measurement and the second is by battery voltage measurement. The two approaches are described in the example section herein below.

In one embodiment, the term "a" or "one" or "an" refers to at least one. In one embodiment the phrase "two or more" may be of any denomination, which will suit a particular purpose. In one embodiment, "about" or "approximately" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

EXAMPLES

Example 1

Process Control by pH Measurement

The control of the shutdown/washing process is based on measurement of the pH of the washing solution (by signal of pH electrode mounted in the washing solution tank), and dosed addition of neutralizing agent accordingly.

A standard glass diaphragm pH electrode (Metrohm Corp.) was used. Usual glass pH electrode produces analog voltage signal of 50-60 mV per pH unit; the signal that can be easily calibrated and interpreted. Thus, in the described embodiment, a pH electrode (1-70) was directly connected to the analog input of a controller (1-50) which was programmed to control the dosing device (1-80).

Figure 2A:
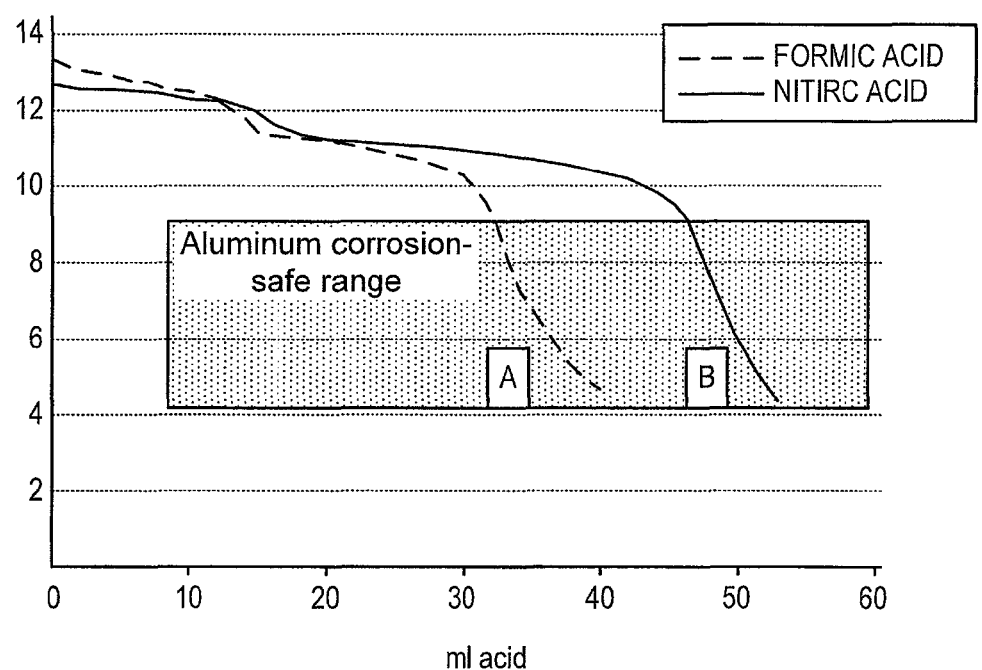
FIG. 2a is a graph showing the change of pH of the recirculating washing solution as a function of the amount of added neutralizing agent in (ml). Two different types of neutralizing agents are shown: 99% formic acid (line A) and 70% nitric acid solution (line B). The recirculating washing solution was added to a 10-cell Al-air battery at shutdown after operation cycle.
Figure 2B:
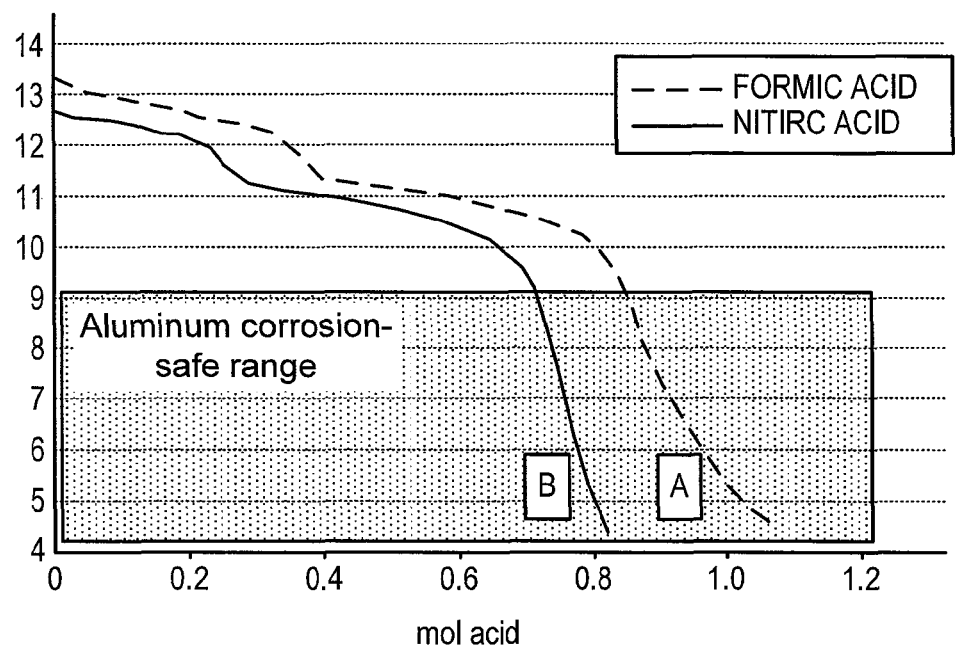
FIG. 2b is a graph showing the change of pH of a recirculating washing solution as a function of amount of added neutralizing agent in mole units. Two different types of neutralizing agents are shown: 99% formic acid (line A) and 70% nitric acid (line B) solution. The recirculating washing solution was added to a 10-cell Al-air battery at shutdown after operation cycle.

FIG. 2 shows the results of a practical experiment of shutdown/washing cycle that was conducted according to the disclosed approach. FIG. 2A shows pH as a function of ml acid added. FIG. 2B shows the pH vs. the number of moles of acid added. Line A refers to a process conducted with concentrated formic acid as the acidic agent. Line B represents a process that was conducted with concentrated nitric acid as the acidic agent.

Aluminum-air battery (Phinergy Ltd.), having 400 $cm^2$ in electrodes cross-section, 10 single cells in series, and electrolyte volume of ~3 L, was shut down, emptied from used electrolyte, switched to the washing solution circulation (initially containing water), to which neutralizing agent (formic or nitric acid) was gradually added along with simultaneous measurement of pH of the washing solution. Two distinct areas are seen on the pH curves: one plateau-like part at a pH range above 12, which corresponds to the neutralization of unreacted alkali in the residual electrolyte, and the second part at pH 11-9, which corresponds to the neutralization of alkaline aluminates. Criterion of accomplishment of the washing process is pH=9 or below, where the battery can be emptied of the washing solution and left for safe standby. This criterion was fulfilled as shown in the graph.

Figure 3:
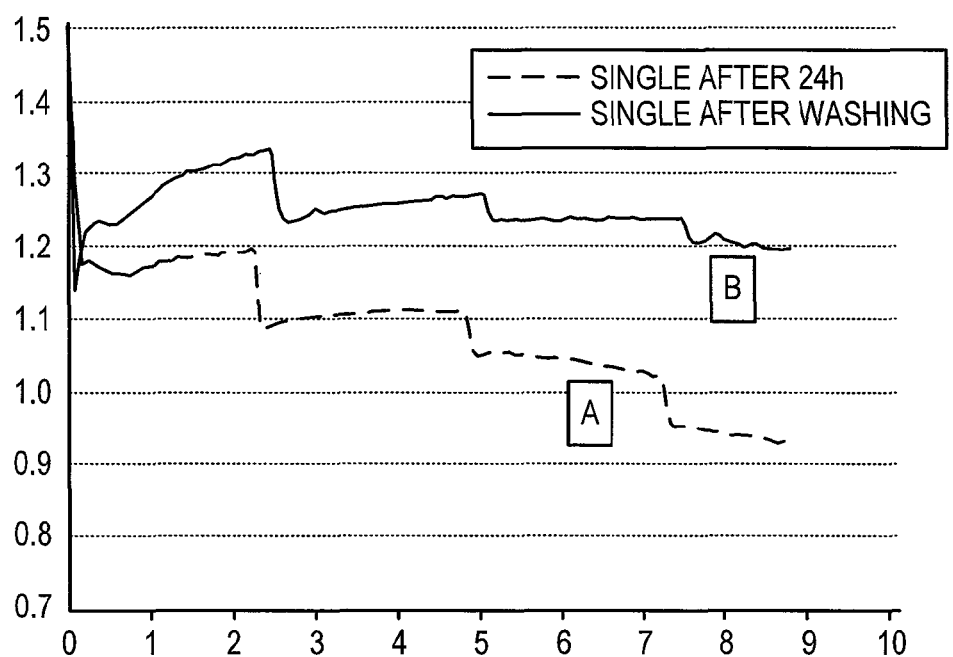
FIG. 3 is a graph showing the restart of Al-air battery after shutdown and 24 hours standby: average voltage per single cell at the same current profile is shown. Comparison between shutdown by electrolyte pumping-out only (lower line, line A) and shutdown according to an embodiment of this invention (upper line-line B). The neutralizing agent used was formic acid.

FIG. 3 shows a comparison between two cases of restart of the same battery after 24 hours standby. In the first case, the battery was restarted after the application of the disclosed washing shutdown process and in the second case, the battery was restarted without prior application of the disclosed washing process. In FIG. 3, the axes are as follows: Y is the battery voltage (V) normalized per single cell; X is the battery run time (min).

At restart, the battery was filled by electrolyte, and then gradually increasing current draw was applied (20 A, 40 A, 60 A and 70 A). In the figure, voltage of the battery is shown (normalized to the one single cell) versus elapsed time (min). One can see that the battery, that was washed at shut down according to the disclosed procedure (line B), confidently developed the rated power (70 Amp current, cell voltage 1.2V) while the same battery being left for 24 hours without the disclosed washing procedure (line A) actually failed to start-up (because of aluminum anodes corrosion/passivation).

Example 2

Process Control by Battery Voltage Measurement

In the case where the use of a pH electrode in the washing solution tank or container is problematic, an alternative indirect way for washing process control was used.

Figure 4:
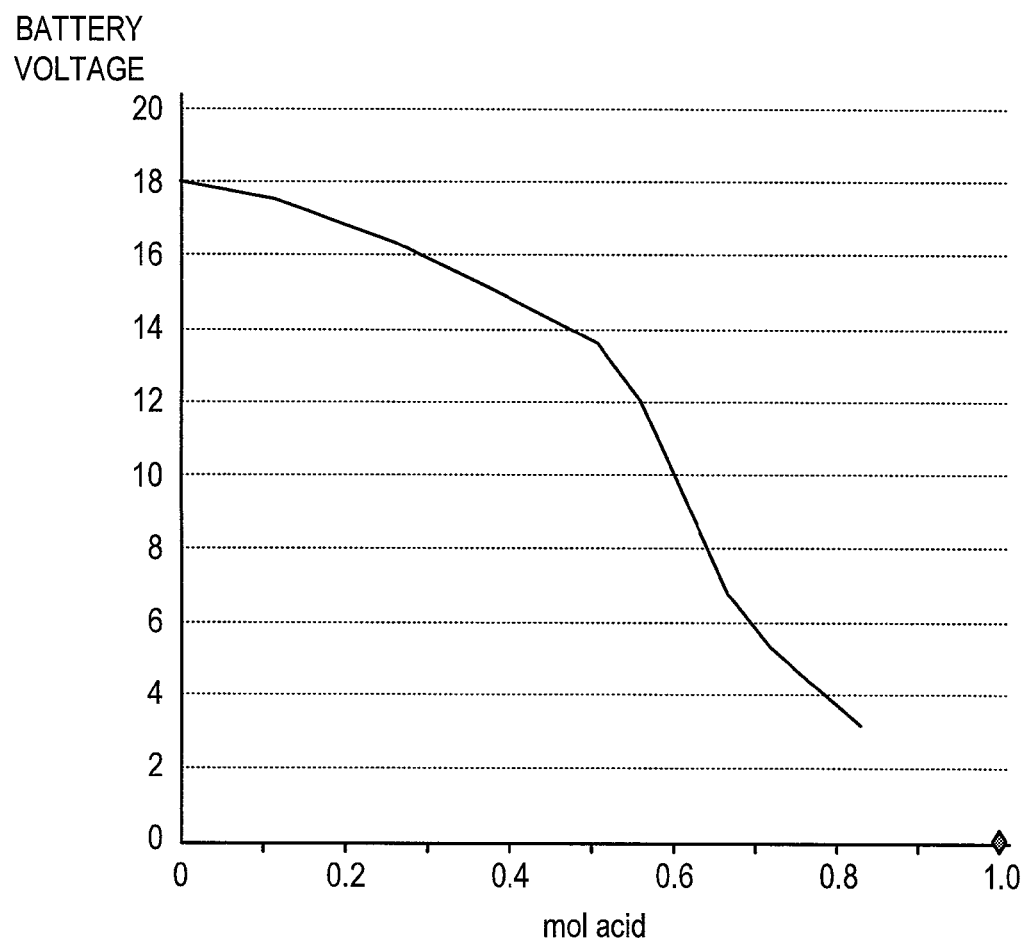
FIG. 4 is a graph showing washing at shutdown of a 10-cell Al-air battery. The washing process is controlled by voltage measurement at constant current draw 1 mA/cm$^2$. Voltage as a function of neutralizing agent addition into the system is shown.

The washing solution functions as a weak electrolyte. The battery filled by the washing solution is able to perform a certain electrical activity. Accordingly, the voltage of the battery while connected to the electrical load was measured, enabling weak current in the range of 1-10 mA per 1 $cm^2$ of the electrode area. The voltage of the battery under this electric load changed as a function of the change in the pH of the washing solution, and the desired degree of neutralization was set by addition of neutralizing agent until the desired voltage of the battery filled with the circulating washing solution was reached. FIG. 4 shows the results of the washing cycle. In the figure, battery voltage vs. moles of added acid is shown. The decrease in voltage corresponds to the decrease in pH of the solution.

What is claimed is:

1. A method for a metal-air battery shutdown followed by a standby mode, said method comprises:
   transferring an electrolyte solution of a battery to an electrolyte tank;
   circulating a washing solution comprising an acidic agent through said battery; and
   transferring said washing solution to a washing solution reservoir when said washing solution reaches a predetermined pH value;
   thereby the battery is shutdown and is in a standby mode.

2. The method of claim 1, wherein during said circulation, the pH of said washing solution is monitored by pH monitoring element and wherein if the pH value of said washing solution is higher than a predetermined value, an acidic agent is added to said washing solution.

3. The method of claim 1, wherein said predetermined pH value ranges between 4-9.

4. The method of claim 2, wherein said pH monitoring element is a pH meter, a voltage meter or combination thereof.

5. The method of claim 1, wherein said circulating of said washing solution is performed between the battery and between a washing solution reservoir that is connected to said battery.

* * * * *